United States Patent
Delamare et al.

(10) Patent No.: US 11,720,630 B2
(45) Date of Patent: Aug. 8, 2023

(54) GENERATING NEW AND UNIQUE DISTRIBUTED GRAPH ID

(71) Applicant: Oracle International Corporation, Redwood Shores, CA (US)

(72) Inventors: Arnaud Delamare, Zurich (CH); Vasileios Trigonakis, Zurich (CH); Yahya Ez-Zainabi, Berrechid (MA); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/141,018

(22) Filed: Jan. 4, 2021

(65) Prior Publication Data
US 2022/0215055 A1 Jul. 7, 2022

(51) Int. Cl.
*G06F 16/901* (2019.01)
(52) U.S. Cl.
CPC ...... *G06F 16/9024* (2019.01); *G06F 16/9027* (2019.01)
(58) Field of Classification Search
None
See application file for complete search history.

(56) References Cited

U.S. PATENT DOCUMENTS

| | | | |
|---|---|---|---|
| 2003/0131104 A1* | 7/2003 | Karamanolis | G06F 16/10 709/225 |
| 2005/0149627 A1* | 7/2005 | Schreter | H04L 61/2069 707/E17.032 |
| 2011/0004566 A1* | 1/2011 | Berkowitz | G06Q 40/06 705/23 |
| 2014/0006465 A1* | 1/2014 | Davis | G06F 16/1752 707/827 |
| 2015/0278397 A1* | 10/2015 | Hendrickson | G06F 16/137 707/798 |
| 2017/0147448 A1* | 5/2017 | Kizhakkel | G06F 16/282 |

OTHER PUBLICATIONS

Wikipedia, the free encyclopedia, "Trie", https://en.wikipedia.org/wiki/Trie, last viewed on Jan. 5, 2021, 9 pages.
Wikipedia, the free encyclopedia, "B+ tree", https://en.wikipedia.org/wiki/B%2B_tree, last viewed on Jan. 5, 2021, 6 pages.
Tiger Graph, "The Only Scalable Graph Database for the Enterprise", https://www.tigergraph.com/, last viewed on Jan. 5, 2021, 10 pages.

(Continued)

*Primary Examiner* — Alex Gofman
*Assistant Examiner* — Umar Mian
(74) *Attorney, Agent, or Firm* — Hickman Becker Bingham Ledesma LLP

(57) ABSTRACT

Techniques are provided for finding unused vertex and edge identifiers (IDs) in a distributed graph engine. A run-time data structure may be built during the loading of the graph. The data structure identifies unavailable IDs that are associated with graph entities of the graph. The data structure is traversed to determine one or more ranges of free IDs. Unused IDs are generated from the ranges.

20 Claims, 12 Drawing Sheets

(56) References Cited

OTHER PUBLICATIONS

Neo4j.com, "Neo4j", https://neo4j.com/, last viewed on Jan. 5, 2021, 14 pages.
JanusGraph.org, "JanusGraph", Distributed, open source, massively scalable graph database, last viewed on Jan. 5, 2021, 4 pages.
Graph Engine, "Serving Big Graphs in Real-Time", https://www.graphengine.io/, last viewed on Jan. 5, 2021, 2 pages.
Apache Spark, "GraphX is Apache Spark's API for graphs and graph-parallel computation" https://spark.apache.org/graphx/, last viewed on Jan. 5, 2021, 3 pages.

* cited by examiner

FIG. 2C    240
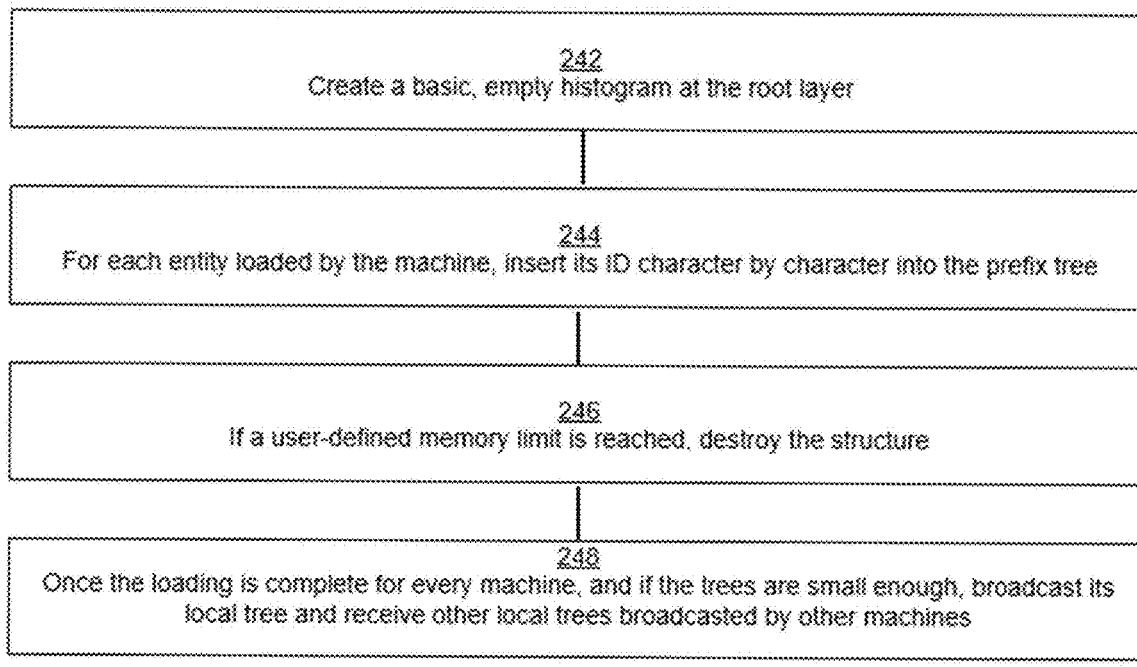
FIG. 3    300
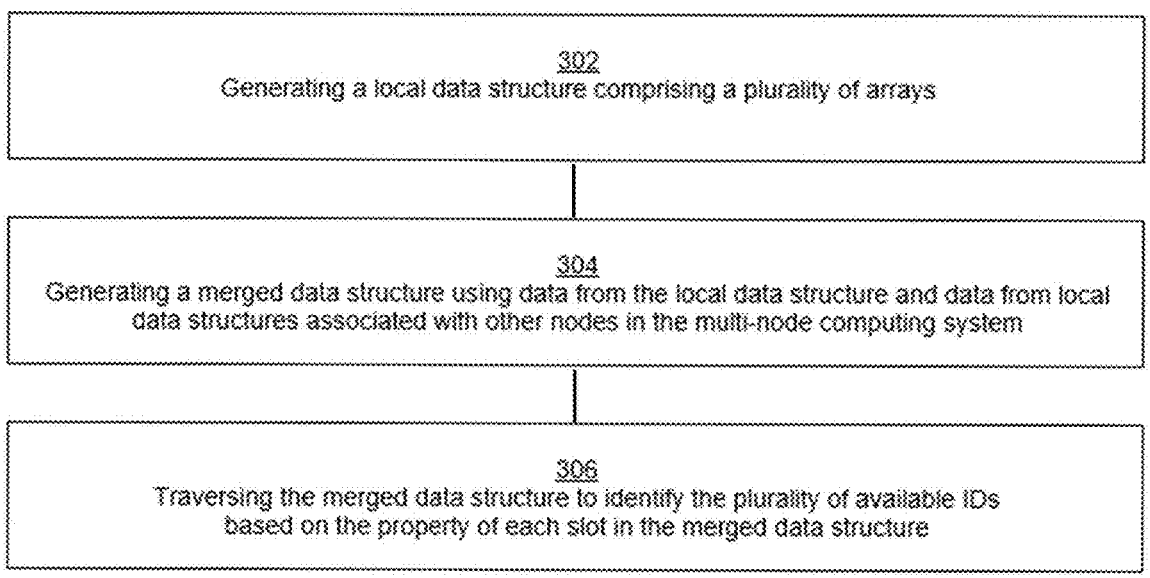

GENERATING NEW AND UNIQUE DISTRIBUTED GRAPH ID

FIELD OF THE INVENTION

The present invention relates to providing new vertex and edge identifiers in a distributed graph engine.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many systems (e.g., databases, graph processing engines) use globally unique identifiers (IDs) to identify entities that are stored (e.g., rows in databases, or vertices and edges in graph processing engines). Generating new unique IDs given a set of existing IDs is an existing problem in computer science.

Two solutions exist that may be used by a system to solve this problem. One solution is to have the system generate new IDs, such as by using a counter. Another solution is to have users provide the IDs. When there is a conflict between the old and new IDs provided by the users, the system reports an error.

However, an issue a system may encounter is when IDs of existing entities are user-provided but new entities are to have auto-generated or system-generated IDs. This issue is found in graph processing engines. Assume a graph is loaded and graph entities (e.g., vertices & edges) in the graph have user-provided IDs. Regular (e.g., daily) updates may be applied to the graph by adding new graph entities. The new graph entities may be missing user-provided IDs because they may not be produced by the same system that generated the graph. Thus, it is not known which IDs have been used. IDs for the new graph entities should be auto-generated. Additionally, users may rely on a graph processing engine as a storage for data. Hence, it is simpler for the users to let the graph processing engine handle the generation of new IDs, instead of having to query it manually and generate the IDs themselves.

If the graph processing engine uses a shared-memory model, a system may have access to hash maps or hash sets that can help generate new IDs. However, generating those unique IDs in a distributed system is more challenging, since no machine has access to the complete data of the graph and, thus, communication is required. Additionally, graph updates often also include graph entity (vertex or edge) deletions, resulting in ID-space fragmentation and making the problem even more complicated.

Furthermore, modern systems allow different ID types to be used (e.g. strings, integers or even composites), which complicates the generation of new IDs even more.

Therefore, there is a need for a solution that not only addresses these problems but also efficiently provides new IDs in a distributed graph engine while allowing a graph to be processed as fast as possible.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 2C illustrates a flow diagram of building a prefix tree.

FIG. 3 illustrates an example process for determining a plurality of available IDs, during a loading of a graph, for a plurality of unidentified graph components of the graph.

DETAILED DESCRIPTION

Figure 1A:
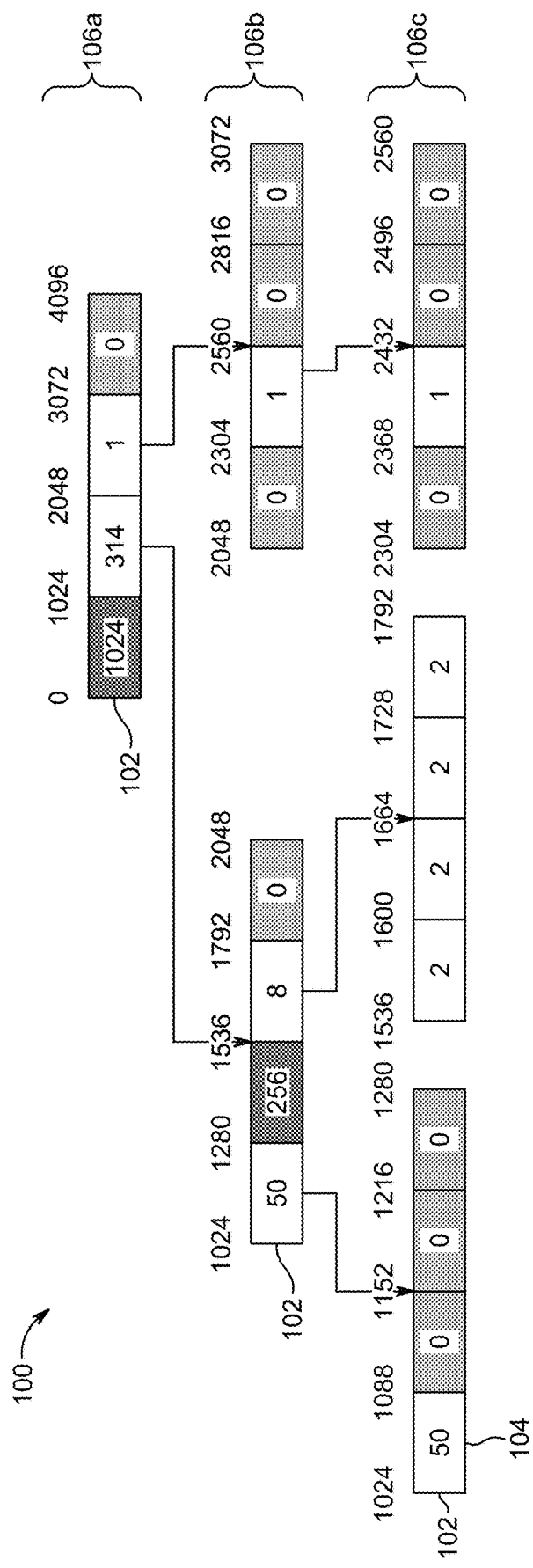
FIG. 1A illustrates an example adaptive histogram.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques described herein efficiently generate unused vertex and edge identifiers (IDs) in a distributed graph engine. For example, generating unused IDs is necessary when a graph is updated to add new vertices and/or edges. The techniques employ different routines, ranging from optimistic routines that are highly efficient, to more pessimistic routines that are resilient to adversaries. In an embodiment, the optimistic routines build run-time data structures during the loading of the graph.

In an embodiment, the data structures store information regarding used or unavailable IDs (e.g., IDs that have already been assigned to existing vertices and/or edges in the graph). Unused or available IDs are generated from the data structures. The data structures are memory efficient and can be tuned by users to use more memory in order to boost performance or vice-versa. The data structures can also be disabled completely if the user wants to minimize the memory usage of the system. The techniques described herein significantly decrease the time to find unused or available IDs therefore reducing the time needed to perform an update to a distributed graph.

Throughout the discussion, the terms in Table 1 are used to aid in the understanding of certain concepts pertaining to the associated techniques. The terms are solely intended for the purpose of providing an easy methodology of communicating the ideas expressed herein and are in no way meant to limit the scope of the present invention. The table below does not include a full definition and/or description. A full definition and/or description of any term can only be gleaned by giving consideration to the full breadth of this patent.

TABLE 1

| | |
|---|---|
| auto-generated IDs | These are IDs of existing graph entities in the graph that have been generated by the system (either when loading the graph or adding new graph entities). Hence, it can be assumed that the generation schemes are known. When loading a graph, a user chooses either to let the system auto-generate the IDs or to provide the IDs themselves. |
| user-provided IDs | These are IDs of existing graph entities in the graph that have been provided by the user either when loading the graph or adding new graph entities. Nothing can be assumed about the IDs. For example, they do not need to be continuous, the distribution can be completely random, etc. However, most users provide IDs that follow certain characteristics. |
| ID space | This is the set of IDs given a datatype. For instance, for unsigned 32-bit integers the ID space is [0, 4294967295]. For strings, the ID space is infinite. For a composite ID containing two 32-bit integers, the ID space is [0, 4294967295] × [0, 4294967295]. In all cases, the ID space is equal to the union of the set of used IDs and the set of available IDs. |
| available (unused or free) ID | This is an ID which is not used by any graph entity in the graph. |
| user | A user is a person or program using a distributed graph processing engine. Unlike other systems (such as websites), it is optimistically assumed that the engine is only accessible to a selected group of persons that does not have any interest in degrading the performance of the engine. However, in case this assumption does not hold, the current solution will not crash and will still yield reasonable performance. |
| adversary | An adversary is a malicious user that wants to reduce the performance and/or crash the engine. It can also include a user/program that is unaware of the internal implementation of the system and that inadvertently produces a graph that has an ID distribution that is highly different than standard graphs. |

Distributed Graphs

A graph is a data structure used to model relationships between objects. A graph consists of a set of vertices (corresponding to objects) and a set of edges (corresponding to relationships). When data for a specific application has many relevant relationships, the data may be represented by a graph.

In a distributed system, a graph may be partitioned and distributed across several machines or nodes such that each vertex resides on exactly one machine. As a result, there are two types of edges: local edges and remote edges. A local edge is an edge connecting two vertices on the same machine. A remote edge is an edge connecting vertices from different machines.

As used herein, graph components or graph entities refer to vertices and/or edges of a distributed graph. In graph processing, entity IDs do not need to be unique across both vertices and edges in a graph. When an ID is referred to as being unique with respect to the graph components of a graph, the ID of an edge or vertex may be unique among the IDs of all the edges and vertices of graph, or the ID may be unique only among the IDs of edges of the graph or may be unique only among the IDs of the vertices of the graph. For instance, it is acceptable to have a vertex and an edge with both ID 2, but vertices cannot have the same ID.

Implementation Considerations

Given an existing graph with user-defined IDs, an implementation should generate a given number N of free or unused IDs, as long as an ID space is not full. When the ID space is full, the system should throw an error. N free IDs may be requested because insertions of new graph entities into a graph may be performed in batches and not one by one.

For small integer size (e.g. 32 bits) used to reduce memory space utilization, the size of space of available IDs is possibly in the same orders of magnitude as the number of graph entities. An implementation thus should not waste the ID space by, for instance, leaving large chunks of IDs unused. An implementation should also handle integer overflows.

An implementation should not slow down operations in the graph engine, and its memory footprint should be low.

For string IDs, an implementation should keep generated string IDs as short as possible to minimize memory consumption. For integer IDs, this issue does not exist as they use a fixed size of memory, independently of its content.

An implementation should provide free IDs that are easily readable by humans. For instance, new integer IDs should be positive and as small as possible, and new string IDs should not contain characters that would make the strings hard to read (e.g., no whitespaces or line breaks, only ASCII characters should be used).

Communication between the machines should be reduced to a minimum. Since remote operations (e.g., if a machine wants to know if a given ID is free or not in another machine) are orders of magnitude slower than local operations, remote calls should be reduced to a minimum for performance reasons.

One possible solution that avoids communication overhead is to fully replicate the used IDs in every machine. Several data structures can be used for this, such as a hash set or a sorted heap. However, this solution prevents scaling of the system and consumes prohibitively high memory. Another possible solution is to simply iterate over the full ID space and perform a communication round for every ID to determine if it is in use or not. However, this solution is very slow, especially when the number of requested ID is large.

The current solution implements techniques, as described herein, that fulfill all of these considerations.

Top-Level Design

A specific type for IDs of graph entities is not assumed. Accordingly, an ID type can be a 32-bit integer (unsigned and signed), a 64-bit integer (unsigned and signed), a string, or a composite of multiple types. Two composite IDs are equal if and only if all of their components are equal. The ID type is the same for all vertices and similarly for edges, but those two types can be different.

A generated string ID may be restricted to using the following allowed characters to improve readability of the generated string: lower case ASCII letters, upper case ASCII letters, numbers, "@" symbol, and the "#" symbol. However, other allowed characters may be included in the generated string IDs.

The set of 64 characters does not need the full 8 bits of a standard character to be stored; instead, only 6 bits of a character are stored. The current solution optimizes the storing of generated strings by concatenating the first 6 bits of each character together when storing, and reads the extra 2 bits per character when the strings are read.

During the loading of a graph, if IDs are not user-provided, they are generated as follows. For integers, the first graph entity will receive the smallest integer of the ID space (e.g., 0 for unsigned integers). Subsequent graph entities will be attributed an ID sequentially. For strings, the first graph entity will get a single byte set to 0. Subsequent graph entities will receive sequentially larger values, with more bytes if required to avoid overflow. Each value is then converted into groups of consecutive 6 bits, each of those being mapped to one of the allowed characters.

The current solution uses a scalable system to store the different IDs. For both vertices and edges, each machine is responsible for storing the graph entities for which the hash of the ID modulo the number of machines is equal an ID of a respective machine. In an embodiment, IDs are contained in [0, # of machines). In an embodiment, for integer IDs, an identity function may be used to distribute the IDs. The system may quickly determine whether a given ID is being managed by the current machine or not. For string IDs, any hash function that provides a fair distribution may be used.

In typical graphs with user provided IDs, IDs of existing vertices are either continuous or form large chunks of continuous IDs. This is because graph entities are usually generated by another program that uses sequential IDs. Since graph entities can belong to different groups, their IDs might be continuous in their group, but there might be gaps in the ID space between the groups. For instance, in a graph linking persons to pets, the IDs of the persons could typically be between 0 and N, and the IDs of the pets between 1,000,000 and 1,000,000+M. This is because there could be two programs generating the IDs of the persons and the pets independently. The current solution avoids overlap between the two.

In an embodiment, for string IDs, graph entities have IDs consisting of a prefix indicating the group (for instance, person or pet in the above example) followed by a number, from 0 to the number of graph entities in this group.

Techniques for Integer IDs

Depending on whether users want to focus on performance or reduce memory consumption, the current solution creates helper data structures, created during the loading of the graph, that can speed up the generation of free IDs, at the cost of increased memory consumption.

Creating Helper Data Structures During Graph Loading.

An adaptive histogram is one of the helper data structures. FIG. 1A illustrates an example adaptive histogram 100. The adaptive histogram 100 captures the density of the usage of an ID space (e.g., domain of possible IDs), providing a low resolution when the part of the ID space is completely empty or full and a high resolution when there are both free and used IDs.

A base structure of the histogram 100 is an array 102, divided into slots 104, that represents the full ID space. Each slot 104 represents a continuous part (e.g., subdomain) of the ID space and stores the number of used IDs in this part of the space. If a slot 104 is neither empty nor full, another array for the slot will be instantiated and linked to the slot, dividing the ID space into more fine grained slots. This operation is repeated until a maximum depth is reached. This depth is configurable by a user.

The histogram 100 has an ID space of [0, 4096) and the maximum depth of 3. Light gray slots are empty, dark gray slots are full, and white-colored slots neither full nor empty. At the root layer 106a, a single array 102 represents the entire ID space. There are two arrays 102 at the next layer 106b: one array represents [1024, 2048) of the ID space and another array represents [2048, 3072) of the ID space. There are three arrays 102 at the bottom layer 106c: one array represents [1024, 1280) of the ID space, one array represents [1536, 1702) of the ID space, and another array represents [2304, 2560) of the ID space. Each array 102 below the root layer 106a provides a more fined grained view of corresponding part of the ID space. If a slot in one layer that is not linked with an array, then the slot is a leaf slot. For example, the slot representing [0, 1024), the slot representing [1792, 2048), the slot representing [1728, 1792) are leaf slots as they each are not linked with an array. In an embodiment, leaves are present in a histogram if there is a slot that is full, if there is a slot that is empty, or if the maximum depth/memory consumption has been reached.

Figure 1B:
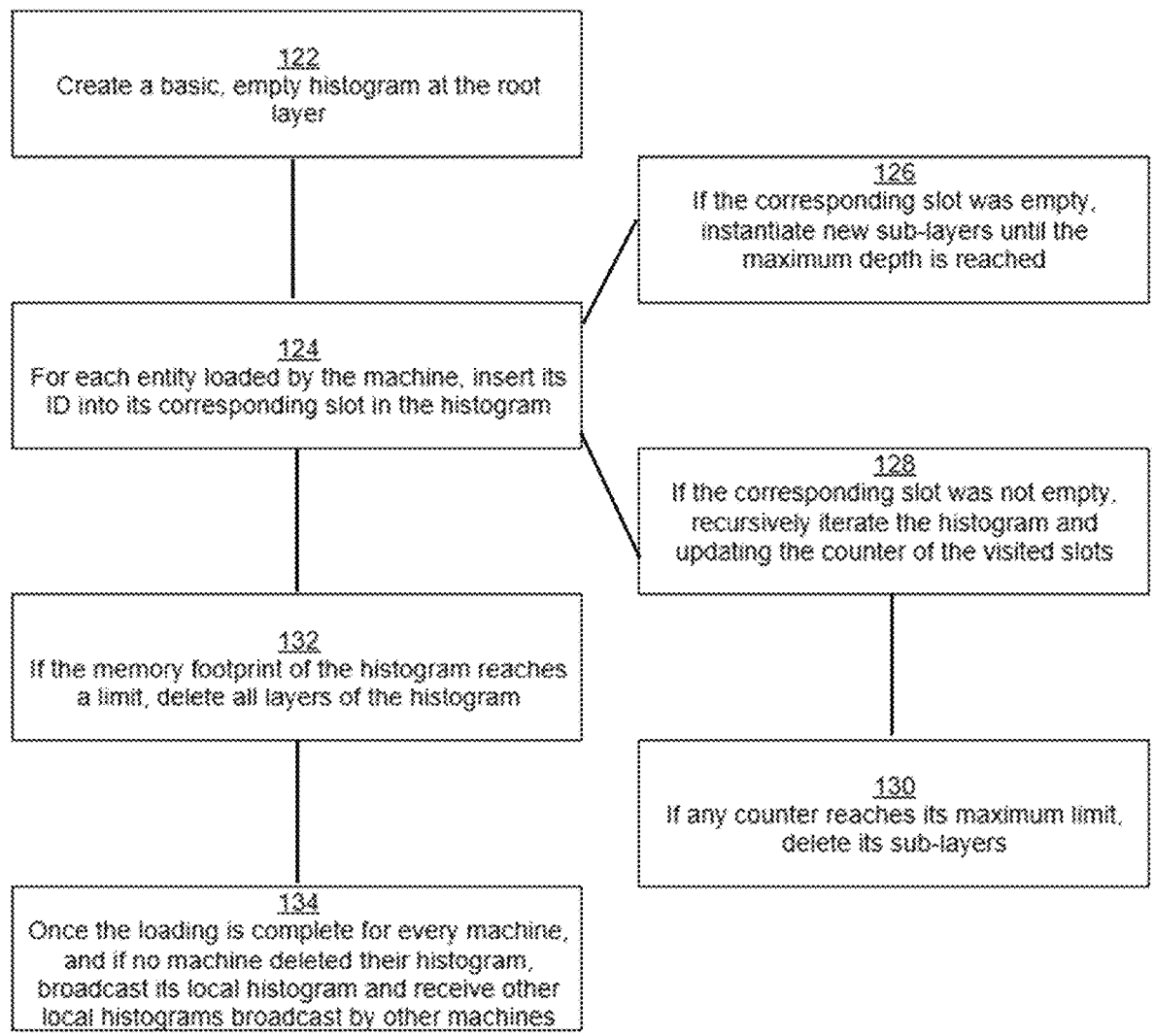
FIG. 1B illustrates a flow diagram of building an adaptive histogram.

FIG. 1B illustrates a flow diagram 120 of building an adaptive histogram. The adaptive histogram, such as the histogram 100, is built during loading of a graph on a machine of a multi-machine environment. Each machine builds its own histogram 100. At block 122, a basic, empty histogram is created at the root layer. The machine loads graph entities independently of the other machines in the environment. In an embodiment, each entity is only loaded once by a single machine in the environment.

At block 124, for each graph entity loaded by the machine, its ID is inserted into its corresponding slot in the histogram. In particular, at block 126, if the corresponding slot was empty, new sub-layers are instantiated until the maximum depth is reached; all of the visited slots have their count set to 1, and the created slots where the ID does not belong have their counter set to 0. Otherwise, at block 128, if the corresponding slot was not empty, the histogram is recursively iterated (by creating new sub-layers if required), and the counter of the visited slots are updated. At block 130, if any counter reaches its maximum limit (indicating that the respective slot is full), its sub-layers are deleted.

At block 132, if the memory footprint of the histogram reaches a limit, which may be user-provided limit or set by default to a few kB, all layers of the histogram are deleted. This can happen when a graph does not have large chunks of continuous IDs. In such a case, the histogram would not be very helpful when generating free IDs.

At block 134, once the loading is complete for every machine, and if no machine deleted their histogram, the machine broadcasts its local histogram and receives other local histograms broadcast by other machines. The machine merges all local histograms to create a merged or global histogram that is common to all machines. If the memory footprint of the global histogram reaches a user-provided limit, all layers of the global histogram are deleted.

The merged histogram that is generated, such as the one shown in FIG. 1A, can also be used for other parts of the engine, such as query planning, where it can be used to estimate the cost of different query plans by providing an approximation of the distribution of the IDs. For example, a problem when comparing query plans is to know the selectivity of filters given by the user. Performing first the filter that has the least selectivity will improve the performance of the query evaluation. Assume a query contains two filters id(vertex)<1024 and id(vertex)>2048. The histogram can be used to quickly provide an estimation of the selectivity for both filters.

After the merged histogram is generated, another data structure, referred to herein as a free ID allocator, is instantiated. The free ID allocator stores a list of free ranges. It does not need to store all the free IDs in the ID space, but uses the histogram to provide a list of ranges that are certain to be unused.

Free ranges are determined from an adaptive histogram, such as histogram 100, by recursively traversing the histogram starting from the left-most slot to the right-most slot, only checking the leaf slots. If the current slot is empty, its start ID is stored, and the iteration continues. As long as the visited slots are empty, nothing is done. However, as soon as a non-empty slot is found, a new range of free ID (ranging from the start of the first empty slot to the start of the first non-empty slot—1) is added to the list. This process is repeated until the right-most slot is reached.

For instance, in the histogram illustrated in FIG. 1A, the list of free ranges is [1088, 1280), [1792, 2368), and [2432, 4096). There are free IDs that are not in this list, but the free ID allocator data structure provides a very efficient way to get most of the free IDs.

Finding Large Chunks of Free Integer IDs.

If the user does not want to create a histogram to reduce the memory consumption, the current solution offers another routine that does not require any data structure. However, this routine expects the used or unavailable IDs to form large continuous chunks.

Figure 1C:
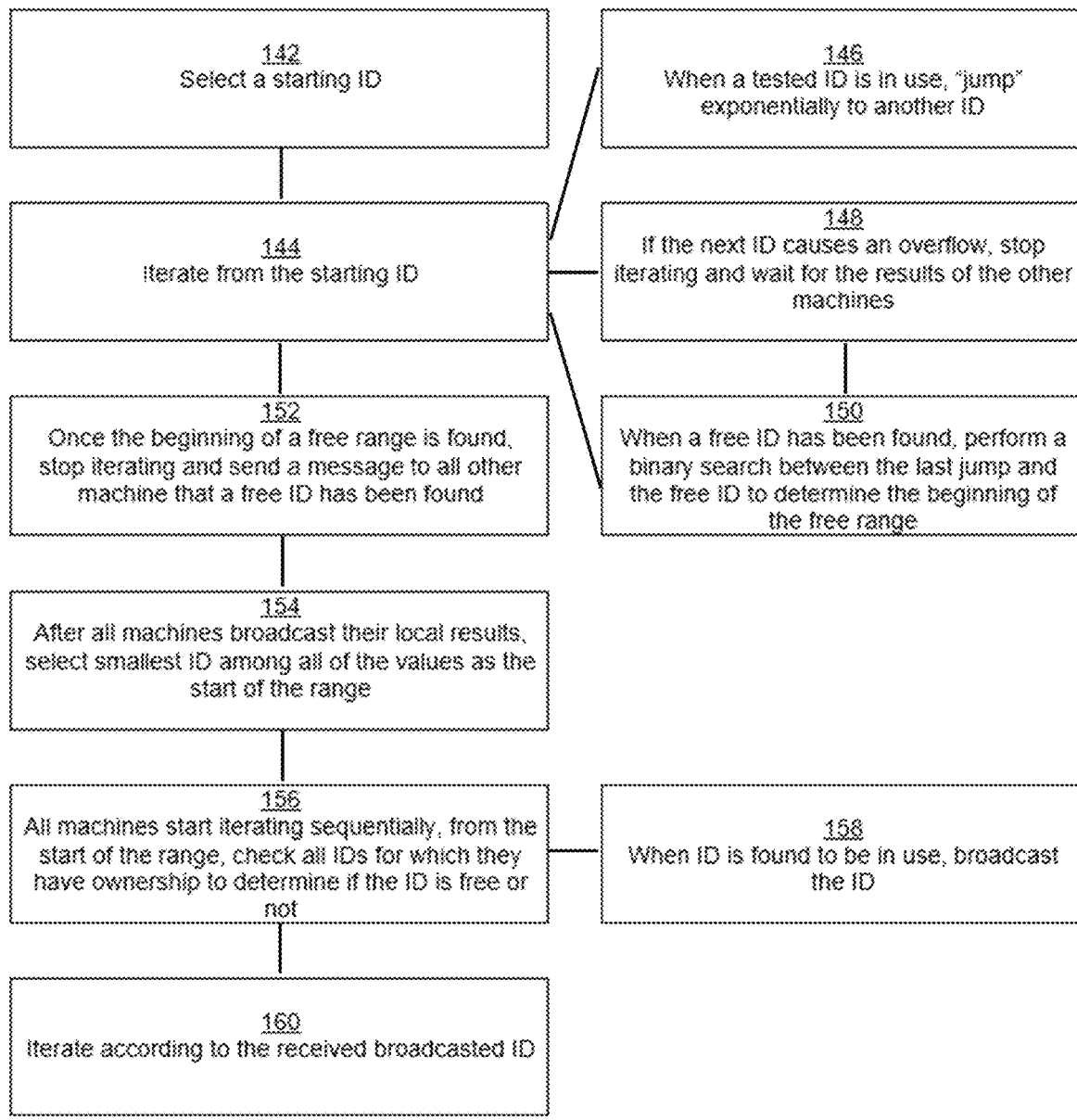
FIG. 1C illustrates a flow diagram of determining available IDs without an adaptive histogram.

FIG. 1C illustrates a flow diagram 140 of determining available IDs without an adaptive histogram. At block 142, a starting ID is selected. Since the current solution aims to keep the integer IDs small and positive, the starting ID is may be set to 0 but other values (e.g., number of graph entities) would also work.

At block 144, each machine starts iterating from this starting ID by only checking the IDs for which they are responsible (e.g., the IDs for which the hash function modulo the number of machines is equal to its machine ID). In an embodiment, the iteration is not sequential but, rather, follows an exponential back-off.

At block 146, when a tested ID has been found to be in use, instead of checking the directly next ID that is owned by the machine, the machine "jumps" exponentially to another ID. For instance, with 10 machines, a linear search by machine 0 would be: 0, 10, 20, 30, etc. With an exponential back-off, the search would be: 0, 10, 30, 70, etc. The maximum "jump" length may be set to, for example, number of graph entities/X in order to avoid jumping over too many free ranges. X is a configurable parameter, for which 1000 is the default value in some embodiments.

At block 148, if the next ID the machine would jump to causes an overflow, then the machine stops iterating and waits for the results of the other machines. If no machine found a free ID with this technique, the machines will revert to use a slower technique (e.g., random and linear search described below).

At block 150, when a free ID has been found, the machine performs a binary search between the last jump and the free ID to determine the beginning of the free range. This assumes that the machine has "landed" in the middle of a free range and not just on a single free ID.

At block 152, once the machine finds the beginning of a free range, it stops iterating and sends a message to all other machine telling them that a free ID has been found.

At block 154, after all machines broadcast their local results, the smallest ID among all of the values is chosen as the start of the range.

At block 156, all machines start iterating sequentially, from the start of the range. They check all IDs for which they have ownership, to determine if the ID is free or not.

At block 158, when they find an ID which is in use, they broadcast the ID.

In an embodiment, if the machines find as many free IDs as required, they stop. If the machines reach the end of the ID space, they stop as well.

At block 160, when receiving such message, each machine does the following: if it is currently iterating on an ID which is smaller, it continues until it either reach the received ID or it finds an ID that is in use. In the latter case, it will broadcast its finding as well. Otherwise, if it is currently iterating on an ID which is larger, it simply stops.

After block 160, all machines have a common start and end of range. If the range provides as many free IDs as required, the process stops. Otherwise, the process is repeated again until the union of all found ranges provide enough free IDs.

Random and Linear Searches.

If the previous optimistic assumption about the ID space containing used IDs forming large chunks does not hold, then the current solution falls back to a random or linear search.

In an embodiment, if the number of existing graph entities and the number of requested IDs together is less than X % of the cardinality of the ID space, a random search is initiated. X is a user-configurable parameter. Its default value is set 90% in order to avoid performing random searches with low chances of success. Each machine randomly tests IDs for which it has ownership. Every machine will regularly broadcast the number of free IDs it has found. Once enough free IDs have been found, the search stops.

In an embodiment, if the number of existing graph entities and the number of requested IDs is not less than X % of the cardinality of the ID space, a linear search, starting from the smallest ID in the ID space, is initiated. Each machine sequentially tests IDs for which it has the ownership. Similar to the random search, every machine regularly broadcasts the number of free IDs it has found. Once enough free IDs have been found, the search stops.

In both cases, the machines coordinate after their local searches in order to make sure that they all agree on the exact set of free IDs returned. In both cases, if there is a histogram present, it can be used to speed up the search by skipping full slots.

Techniques for String IDs

Similarly as for integer IDs, a data structure may be built during the loading of a graph to speed up the generation of unused string IDs.

Finding the Smallest Unused Prefix.

Figure 2A:
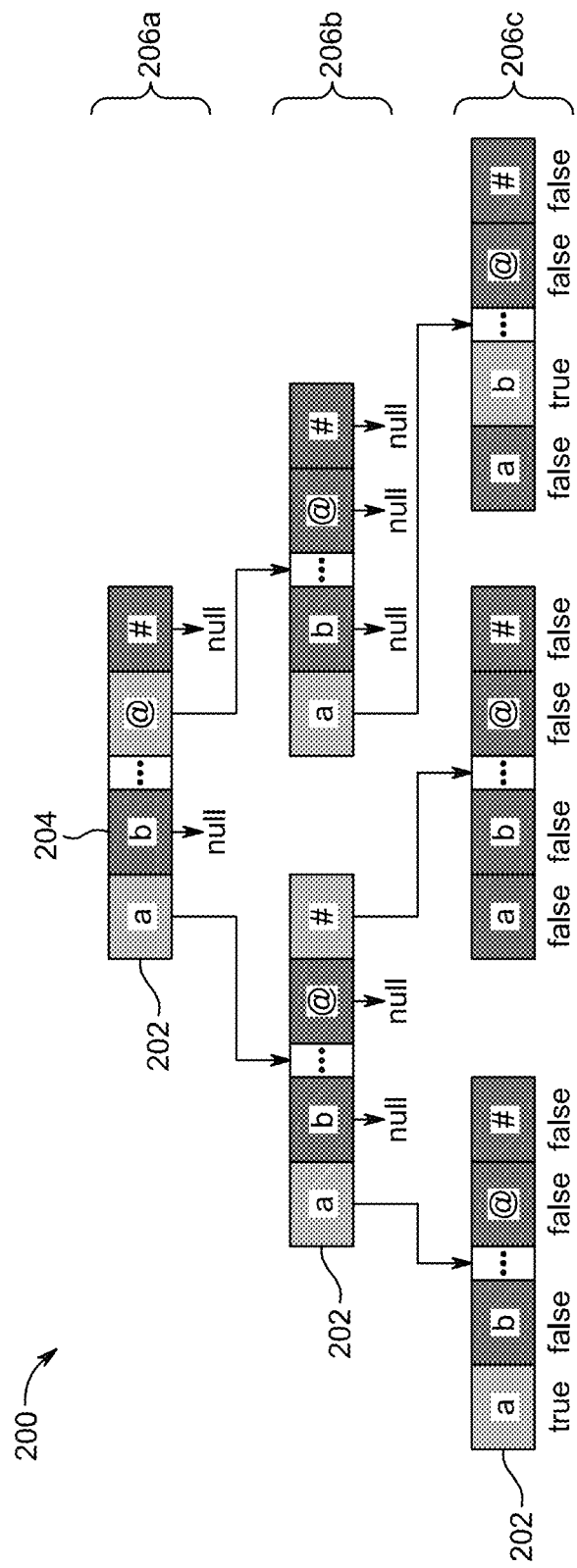
FIG. 2A illustrates an example prefix tree.

In an embodiment, the data structure is a prefix tree. FIG. 2A illustrates an example prefix tree 200. The prefix tree 200 representing the prefixes of all string IDs in use in a graph.

The prefix tree 200 includes a set of "blocks" 204 organized in layers 206a, 206b, 206c and linked together via pointers. A "block" is an array of pointers, one array index or slot 204 per allowed character. Each slot in an array represents a subdomain of identifiers associated with a domain of possible identifiers (e.g., ID space). Each pointer is either null (indicating that there is no string ID beginning with such character in the graph), or points to another layer. To know if a given prefix is used in the graph, the pointer for the first character of the prefix is followed. If it is null, then there is no such prefix in use. Otherwise, the pointed array is looked at or processed. In this array, if the pointer corresponding to the second character is null, then there is no such prefix; otherwise, again, the pointed array must be looked at. This continues either until all characters of the prefix have been investigated, a null pointer is reached, or the last layer including Booleans is reached. At the last layer (which depth may be user-defined), the array contains Booleans indicating whether the graph contains such prefixes.

For instance, if the graph has the following IDs: aaa1, aaa2, aaa3, aaa4, a # and @ab, with a depth of 3, the prefix tree will look like the one illustrated in FIG. 2A. The prefix tree 200 includes the root layer 206a and two sublayers 206b, 206c beneath the root layer 206a. Light gray array indices have valid pointers and Booleans set to true. Dark gray array indices have null pointers and Booleans set to false. If a string ID is smaller than the depth of the tree, then there will be arrays with all null pointers/Booleans set to false, such as the array in the middle for the last depth, as shown in FIG. 2A.

To avoid having large arrays with mostly null pointers, an optimization may be used to compress the blocks into smaller data structures. The optimization transforms arrays that contain less than X non-null pointers into a singly linked list containing pairs of character and pointer to the next block. In an embodiment, the optimization is used when there are 8 or less valid pointers in the block. This is because having more elements would decrease the performance. The unoptimized version (e.g., an array with 64 pointers) will use 64*8=512 bytes (on a 64-bit machine), and the optimization will only use N*(1+8+8), where N is the number of valid pointers, as the optimization stores a character, a pointer, and the pointer for the linked list per element. The linked-list is sorted by character.

Figure 2B:
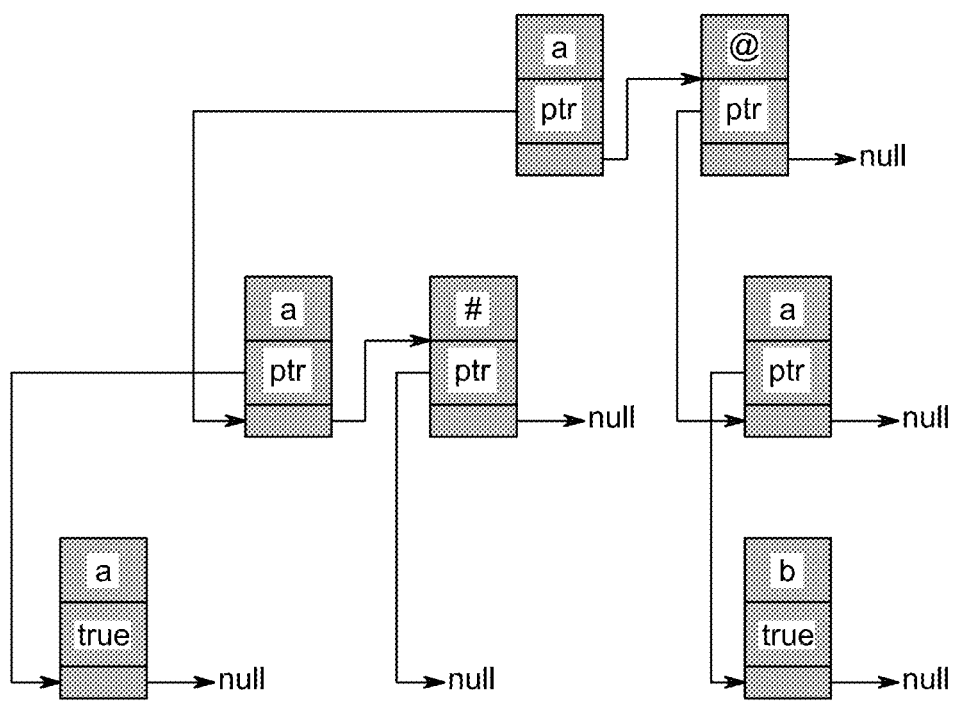
FIG. 2B illustrates an example of an optimized prefix tree.
Figure 4A:
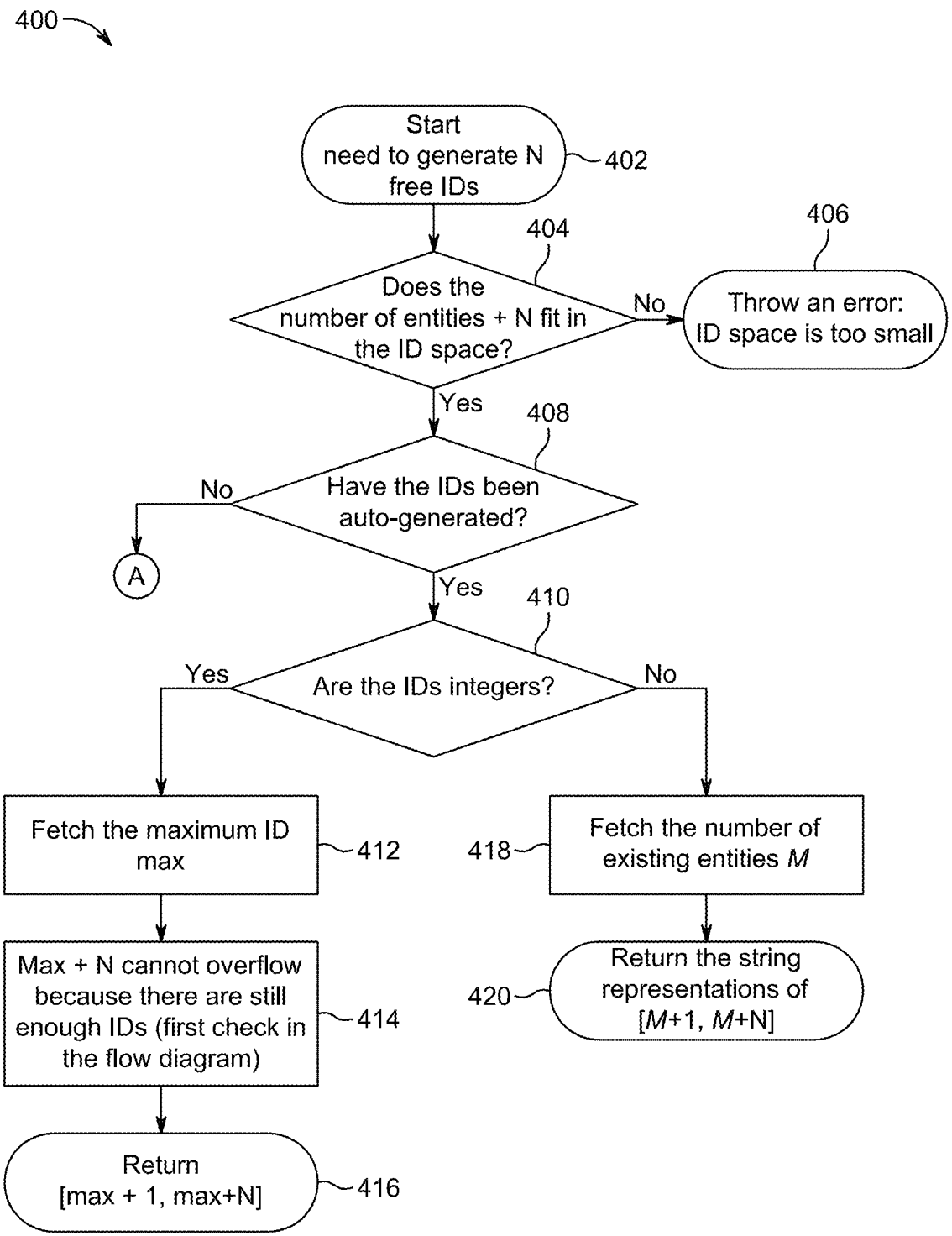
FIGS. 4A-4D illustrates a diagram depicting a flow of providing a plurality of available IDs for new graph entities added to a graph.
Figure 4B:
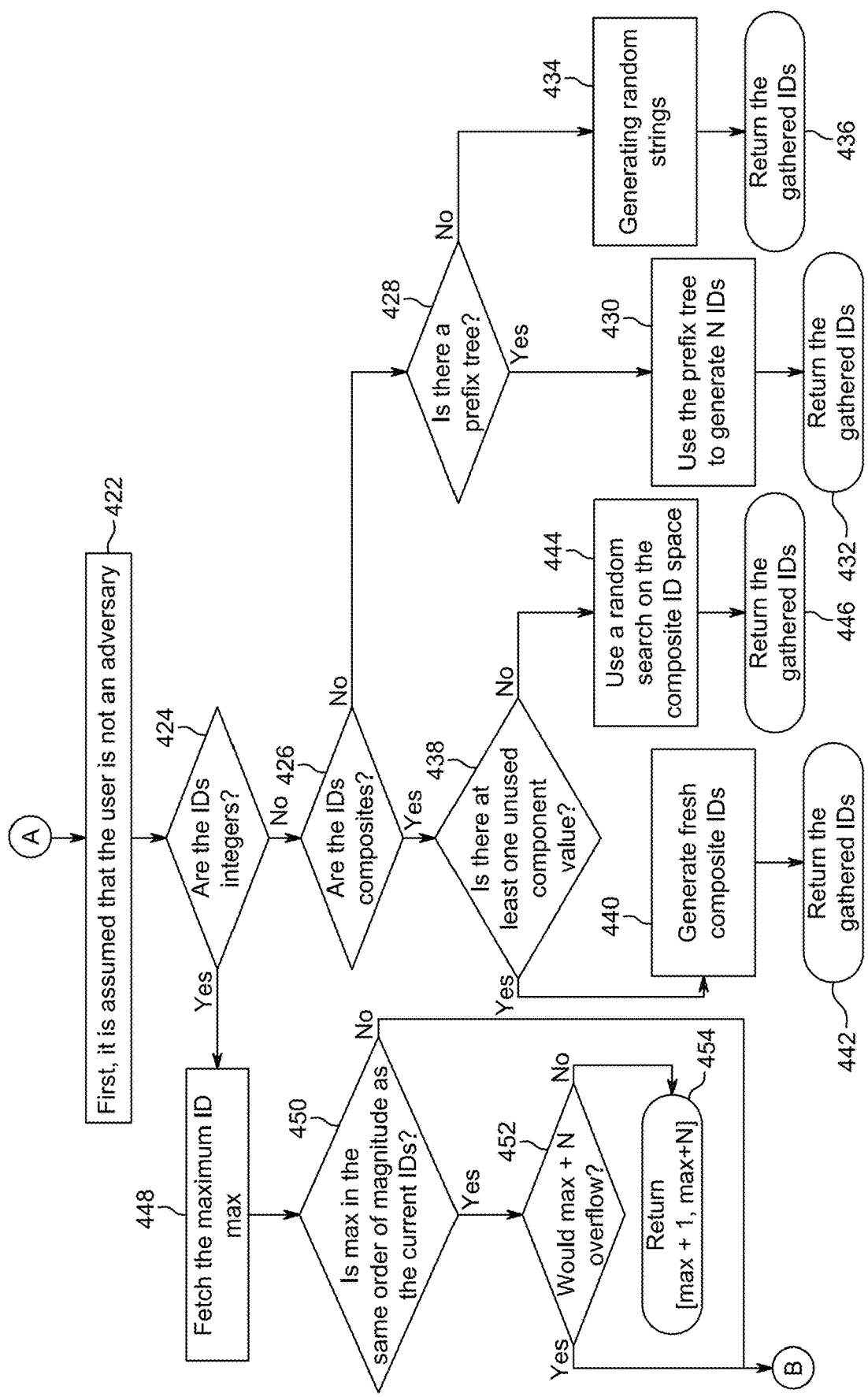
Figure 4C:
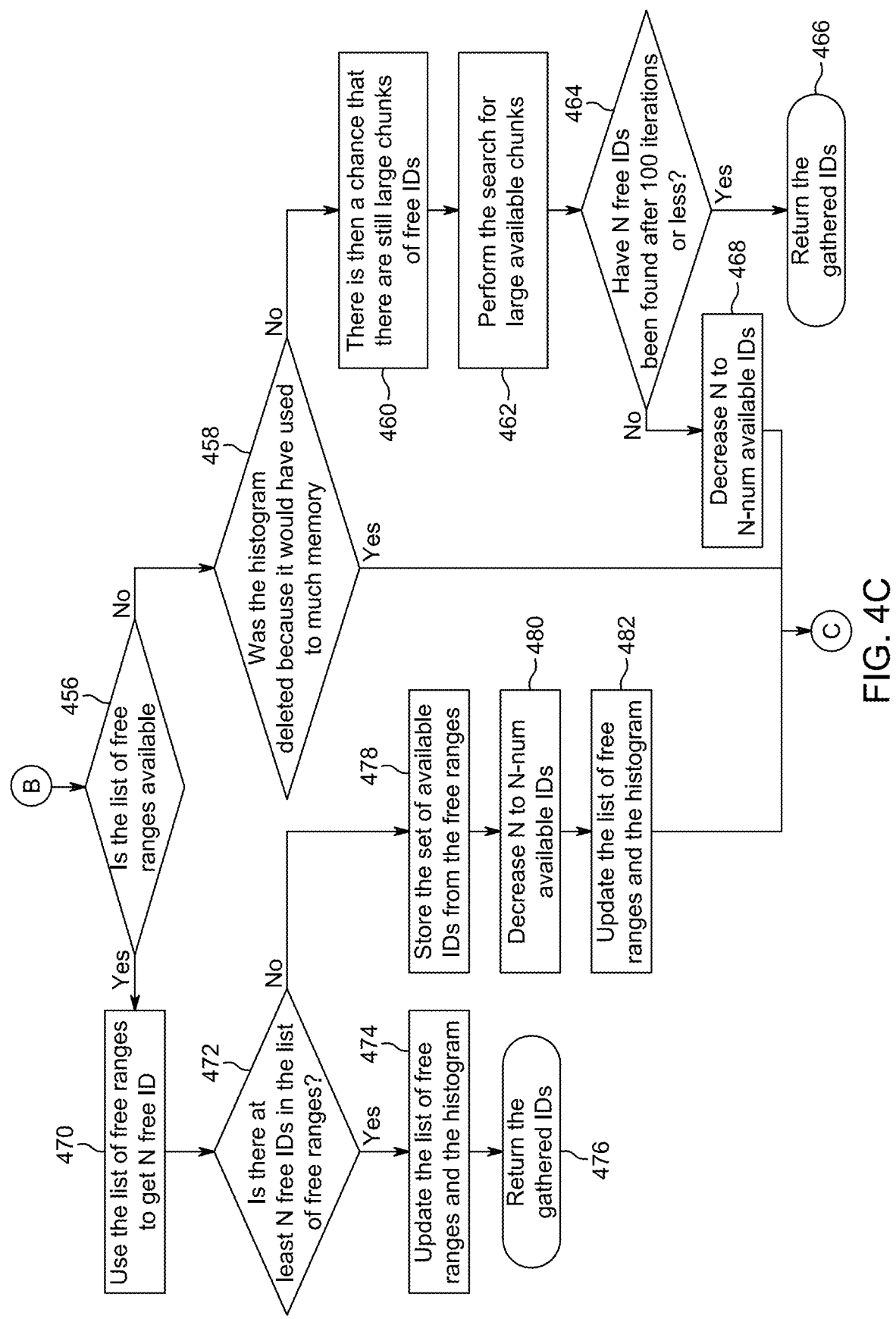
Figure 4D:
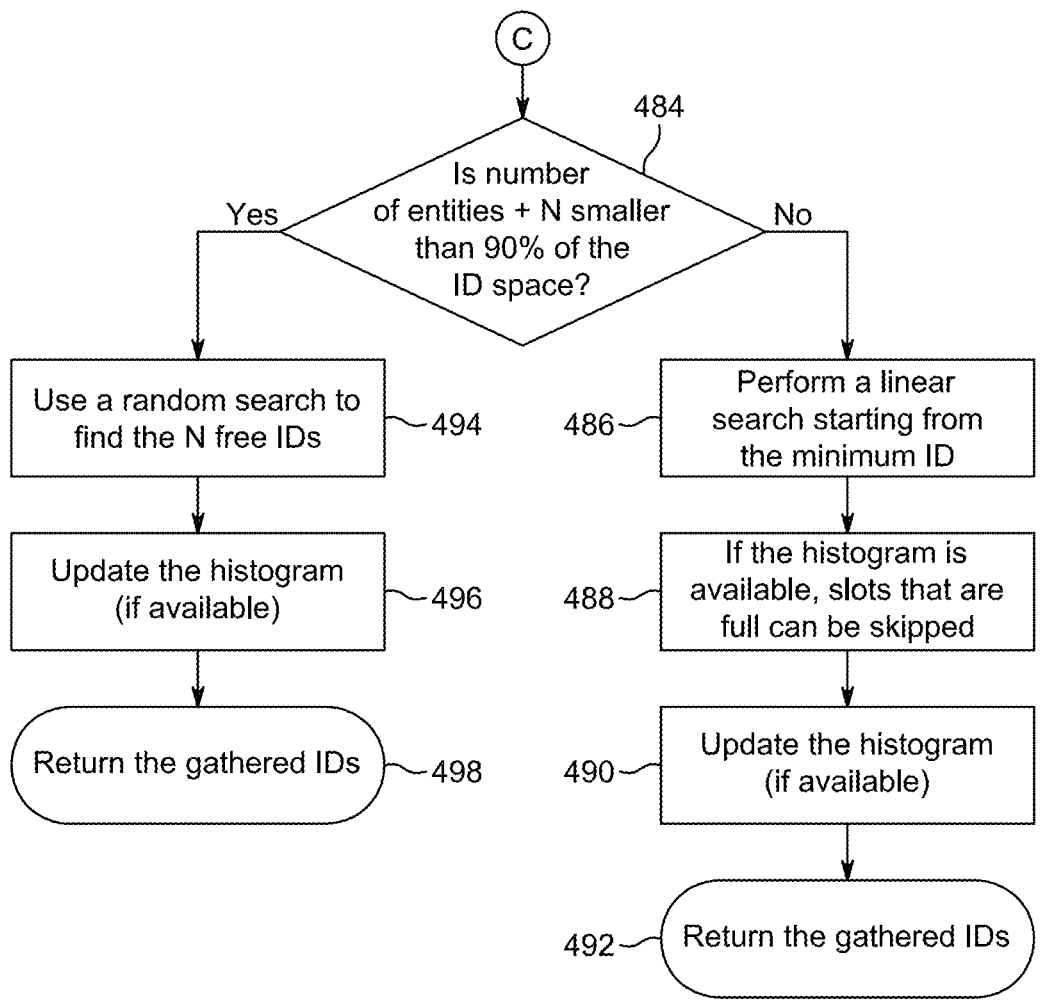

FIG. 2B illustrates the same tree with optimizations, in which all the blocks are optimized as they all have less than 8 valid pointers.

Once a prefix tree is built, it can be used to generate small string IDs efficiently. To generate IDs, the prefix tree is iterated over in a breadth-first search manner. For every array index with a null pointer or a Boolean set to false, it is safe to generate any string starting with this index.

FIG. 2C illustrates a flow diagram 240 of building a prefix tree during loading of a graph on a machine of a multi-machine environment. Each machine builds its own prefix tree. At block 242, a basic, empty array is created, with the root layer only. The machine loads graph entities independently of the other machines in the environment. At block 244, for each graph entity loaded by the machine, its ID is inserted character by character of the ID into the prefix tree, creating new blocks if required. Blocks are initially created as optimized linked-lists. New elements in the linked-list are inserted in a way that keeps the list sorted by character. If too many elements (e.g., >8) are inserted into the linked-list, then the block is transformed into an unoptimized array.

At block 246, if a memory limit is reached, the structure is destroyed; the generation of IDs will use another method. The memory limit may be user-defined or set by default to a few kB.

At block 248, once the loading is complete for every machine, if the trees are small enough, the machine broadcast its local tree and receives other local trees broadcasted by other machines. The machine merges all local trees to create a merged or global tree that is common to all machines. If the memory footprint of the global tree reaches a user-provided limit, all layers of the global tree are deleted.

Once this prefix tree is built, it can be used to generate small string IDs efficiently. To generate IDs, the prefix tree is iterated over in a Breadth-First Search manner. For every array index with a null pointer or a Boolean set to false, it is safe to generate any string starting with this index.

In an embodiment, free IDs are generated at (1) the first array index with a null pointer, (2) missing element in a linked list, or (3) Boolean set to false. For such a prefix, which is the or one of the smallest unused prefix in the graph, 64 unique string IDs composed of this prefix and a single character from the set of allowed characters, are generated.

If the system has generated enough string IDs, it stops. Otherwise, it inserts all the newly generated strings in the BFS queue. They will later be used as prefixes if needed. The system then continues the BFS and finds the next unused prefix which can be on the next layer (e.g., one character longer).

Once the generation is done, the current prefix & the current suffix are stored in case, in the future, new IDs must be generated. When a new request for free IDs comes in, string IDs are generated from those saved prefix/suffix. In this manner, the prefix tree remains untouched and optimized.

Using the prefix tree 200 as an example, the following string IDs are generated in this order:
from the first sublayer (2 characters long): ba, bb, bc, . . . , b@, b #, ca, . . . , #a, #b, . . . , #@, ##
from the second sublayer (3 characters long): aba, abb, . . . , ab@, ab #, aca, . . . , a@, a@a, . . . , baa, bab, . . . , @ba, @bb, . . . , @#a, . . . , @##, . . . , #aa, #ab, . . . , ###
and so on.

Generating String IDs without a Prefix Tree.

If there is no prefix tree, either because the user disabled it or because it was too costly in terms of memory, then the current solution uses an efficient routine to generate unique string IDs.

In an embodiment, each machine initiates a random search of the ID space, starting with a small string length. If the search with a given length only finds an available ID in X % or less of the tests (where X is a user-configurable parameter and set to 10 by default in order to not waste too much time trying to find unused strings that are too small), the machine increases the size of the random string by 1. When the machine generates strings, it first hashes it with the ownership hash function and then, only if it is the owner, tests if there is already a graph entity with this ID. With a length of 10, there are 1,152,921,504,606,846,976 possible strings, so no attackers can prevent this random search, even if they are aware of the protocol.

In an embodiment, the starting length of the search is set to ceil(log(M*(1+X/100))/log(64)), where X is the user-configurable parameter set and M is the number of graph entities. This formula provides the first string length that is expected to have approximately at least X % of free IDs.

Once in a while, machines broadcast their number of found free IDs to the other machines. The whole process stops when the required number of IDs has been found globally.

Techniques for Composite IDs

For composite IDs (e.g., containing multiple integer or string components), free IDs are generated by finding one component value that is unused by any existing ID. Once this component value is found, generating unique IDs is trivial.

If there is no component value that is unused, which is only possible if all the components are integers, a random search on the composite ID space is done to find free IDs.

The unused component value is found by building, for all of the components, histograms for integer components or prefix trees for string components, if allowed by the user. They have the same restrictions as their counterparts for non-composite IDs (e.g. maximum depth, memory limitation, etc.).

The histograms for the integer components are first used to find unused integer IDs. The smallest unused ID for each component is found using the histograms by exploring non-full ranges. The smallest of all of those is chosen as our unused component value.

If there are no integer component or if they do not have unused values, then the prefix tree for the string components is used to find the smallest unused string among all components. This smallest string is chosen as the unused component value.

When generating free IDs with a known unused component value, the other components are generated by, if there is at least one other integer component, returning the previously unused value as the composite value. The value of this other integer component is incremented, and all other components set to 0 or " " (empty string). Otherwise, if there is not another integer component, then the string components are generated as described above.

Building Performance of the Data Structures

In order to not decrease performance during the loading of the graph, the current solution must make sure that the building of the data structures (e.g., histogram or prefix tree) does not have a large performance overhead.

In most systems, the loading of graphs is multi-threaded. The current solution does not introduce contention between the threads by replicating each data structure for each thread while the graph is being built.

Since both data structures have a memory limit of a few kB, they can be replicated without using too much memory. In addition, the data structures can be replicated in all machines in an environment.

For both data structures, if the depth is small enough (e.g., 3 or 4) and if either (1) the vertices/edges are located closely in the ID space (for integer IDs) or (2) the vertices/edges use a small set of prefixes (for string IDs), then the parts of the data structures that are used will be instantiated quickly. The graph entities will then follow a few pointers, which will likely be cached, to either increase the part of the histogram where they are located (for integer IDs) or to make sure that their prefix is already in there. These techniques guarantee good performance during reading of new graph entities.

If the conditions from the paragraph above do not hold, then it is likely that the data structure will quickly exceed its allowed size and it will be deleted, also ensuring good performance for the loading of the graph.

Example Method of Providing Available IDs

FIG. 3 illustrates an example process 300 for determining a plurality of available IDs, during a loading of a graph into memory, for a plurality of unidentified graph components or graph entities of the graph. The graph is distributed in a multi-node computing system. The graph includes a plurality of existing graph components and is distributed in the multi-node computing system such that each vertex in the graph is in a node in the multi-node computing system and each edge in the graph connects a source vertex with a destination vertex in the graph. Each of the plurality of unidentified graph components is a vertex or an edge, in the graph, that is not associated with a unique ID. Each of the plurality of available IDs is unique. Each available ID is an integer ID, a string ID, or a composite ID. In an embodiment, steps 302-306 of FIG. 3 are performed at each node in the multi-node computing system.

At step 302, a local data structure is generated. The local data structure comprises a plurality of arrays. Each of the plurality of arrays comprises K slots, K being a whole number greater than one. The K slots of a respective array represents a subdomain of identifiers associated with a domain of possible identifiers. The plurality of arrays includes a root array in a root layer, a plurality of parent arrays, and a plurality of child arrays. Each child array of the plurality of arrays linked with a slot in a respective parent array. In an embodiment, a property of each slot in each of the plurality of arrays indicates an availability of IDs, in the subdomain represented by a respective slot.

In an embodiment, the local data structure is a histogram. In step 302, the local data structure (e.g., histogram) is generated by creating the root array. The root array is associated with the domain. For each of the plurality of existing graph components, an ID of a respective existing graph component is inserted into a corresponding slot in the local data structure. When the corresponding slot is empty, new sublayers are instantiated until a maximum depth is reached and a count is set to one for all visited slots and set to zero for all other slots. The property of each slot may be the count associated with a respective slot.

In an embodiment, the local data structure is a prefix tree. In step 303, the local data structure (e.g., prefix tree) is generated by creating the root array. The root array is associated with a plurality of allowed characters. For each of the plurality of existing graph components, an ID of a respective existing graph component is inserted, character by character, into the local data structure. In an embodiment, a new array for a particular character of the ID is created when a specific array for the particular character does not exist. New arrays are created in same or different layers of the prefix tree, when required, linking to an array in a previous layer of the prefix tree. In an embodiment, a depth of the local data structure (e.g., prefix tree) is a number of characters in a prefix. A concatenation of each character in a plurality of slots that are linked forms the prefix. The property of each slot (e.g., index) may be the pointer associated with a respective slot.

At step 304, a merged data structure is generated by using data from the local data structure and data from local data structures associated with other nodes in the multi-node computing system.

At step 306, the merged data structure is traversed to identify the plurality of available IDs based on the property of each slot in the merged data structure.

In an embodiment, the merged data structure is a histogram. In step 306, the merged data structure (e.g., histogram) is traversed by, for each leaf slot in the merged data structure and starting from the left-most slot of the merged data structure to the right-most slot of the merged data structure, iterating the merged data structure from a respective leaf slot until a visited slot is non-empty and identifying a subdomain of available IDs from the respective leaf slot to slot prior to the non-empty slot. The subdomain of available IDs includes integer IDs from the domain that are free.

In an embodiment, the merged data structure is a prefix tree. In step 306, the merged data structure (e.g., prefix tree) is traversed by in a breadth-first manner, identifying a subdomain of available IDs from array indices that have null pointers or Boolean set to false. The subdomain of available IDs includes string IDs from the domain that are free.

The method may further include a particular available ID from the plurality of available IDs and assigning the particular available ID to a particular graph component of the plurality of unidentified graph components. The particular graph component may be stored on a particular node that is associated with the particular available ID.

Process Flow Example

FIGS. 4A-4D illustrates a diagram 400 depicting a flow of generating new IDs in a distributed graph engine. The flow begins at block 402, at which there is a need to generate N free IDs. At block 404, it is determined whether there are enough IDs in the ID space to generate N IDs. In particular, it is determined whether the number of existing graph entities plus N fit in the ID space. If there are not enough IDs as determined at block 404, then an error is generated at block 406. Otherwise, if there are enough IDs as determined at block 404, the flow proceeds to block 408.

At block 408, it is determined whether current IDs were auto-generated when the graph was first loaded. If current IDs were not auto-generated as determined at block 408, the flow proceeds to block 422. However, if current IDs were auto-generated as determined at block 408, then new IDs are generated similarly as to how the current IDs were generated during graph loading and it is determined whether the current IDs are integers at block 410.

If the current IDs are integers as determined at block 410, then the maximum ID max is obtained at block 412. At block 414, it is assumed the max plus N does not overflow because there are still enough IDs in the ID space, as determined at the beginning of the flow (e.g., at block 404). At block 416, [max+1, max+N] is returned.

If the current IDs are not integers as determined at block 410, then the number of existing graph entities M is obtained at block 418. At block 420, the string representation of [M+1, M+/V] is returned.

At block 422, it is assumed that the user is not an adversary. At block 424, it is determined whether the current IDs are integers. If the current IDs are integers as determined at block 424, the flow proceeds to block 448. If the current IDs are not integers as determined at block 424, then it is determined whether the current IDs are composites at block 426. If the current IDs are composites as determined at block 426, the flow proceeds to block 438.

If the current IDs are not composites as determined at block 426, then the current IDs are string IDs, and it is determined whether there is a prefix tree at block 428. If there is a prefix tree as determined at block 428, then the prefix tree is used to generate N IDs at block 430. A block 432, the generated IDs from block 430 are returned. If there is no prefix tree as determined at block 428, then the above-described techniques to generate random strings is used to generate N IDs at block 434. At block 436, the generated IDs from block 434 are returned.

At block 438, it is determined whether there is at least one unused component value. If there is at least one unused component value as determined at block 438, then the above-described techniques to generate composited IDs are used at block 440. At block 442, the generated IDs from block 440 are returned. If there are no unused component value as determined at block 438, then the above-described techniques to randomly search on the composite ID space is used to generate free IDs at block 444. At block 446, the generated IDs from block 444 are returned.

At block 448, the maximum ID max is obtained. At block 450, it is determined whether max is in the same order of magnitude as the current IDs. If max is not in the same order of magnitude as the current IDs as determined at block 450, the flow proceeds to block 456. Otherwise, if max is in the same order of magnitude as the current IDs as determined at block 450, then it is determined whether max+N would overflow at step 452. If there will be an overflow as determined at step 452, then the flow proceeds to block 456. Otherwise, if there will not be an overflow as determined at step 452, then [max+1, max+N] is returned at block 454.

At block 456, it is determined whether there is a list of free ranges available (e.g., free ID allocator). If there is an available list of free ranges as determined at block 456, the flow proceeds to block 470. Otherwise, if there is not an available list of free ranges as determined at block 456, then it is determined whether a histogram was deleted because it would have used too much memory at block 458. If a histogram was deleted as determined at block 458, the flow proceeds to block 484. Otherwise, if a histogram was not deleted as determined at block 458, then it is assumed that there are large chunks of free IDs at block 460. At block 462, a search for large available chunks is performed at block 462. At block 464, it is determined whether N free IDs have been found after 100 iterations or less. If so, the generated IDs from the search is returned at block 466. Otherwise, Nis decreased by the number of available IDs at block 468 and the flow proceeds to block 484.

At block 470, the list of free ranges is used to get N free IDs. At block 272, it is determined whether there is at least N free IDs in the list of free ranges. If there is at least N free IDs in the list of free ranges as determined at block 472, then the list of free ranges and the histogram are updated at block 474. At block 476, the generated IDs from the list are returned. If there is not at least N free IDs in the list of free ranges as determined at block 472, then the set of available IDs from the free ranges is stored at block 478. At block 480, Nis decreased by the number of available IDs. At block 482, the list of free ranges and the histogram are updated.

At block 484, it is determined whether the number of existing graph entities plus N is smaller than 90% of the ID space. If it is determined to be smaller than 90% of the ID space at block 494, then a random search is used to find the N free IDs at block 494. At block 496, the histogram (if available) is updated. At block 498, the generated IDs are returned.

If it is determined not to be smaller than 90% of the ID space at block 494, then a linear search is performed, starting from the minimum ID, at block 486. At block 488, if the histogram is available, then slots that are full are skipped. At block 400, the histogram (if available) is updated. At block 492, the generated IDs are returned.

The techniques described herein provide benefits relating to memory consumption (e.g., no huge data structures are required) and performance (e.g., reducing both CPU usage and network communication). The techniques can be applied to any distributed graph processing engine, as it only relies on minimal requirements provided by the engine.

DBMS Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
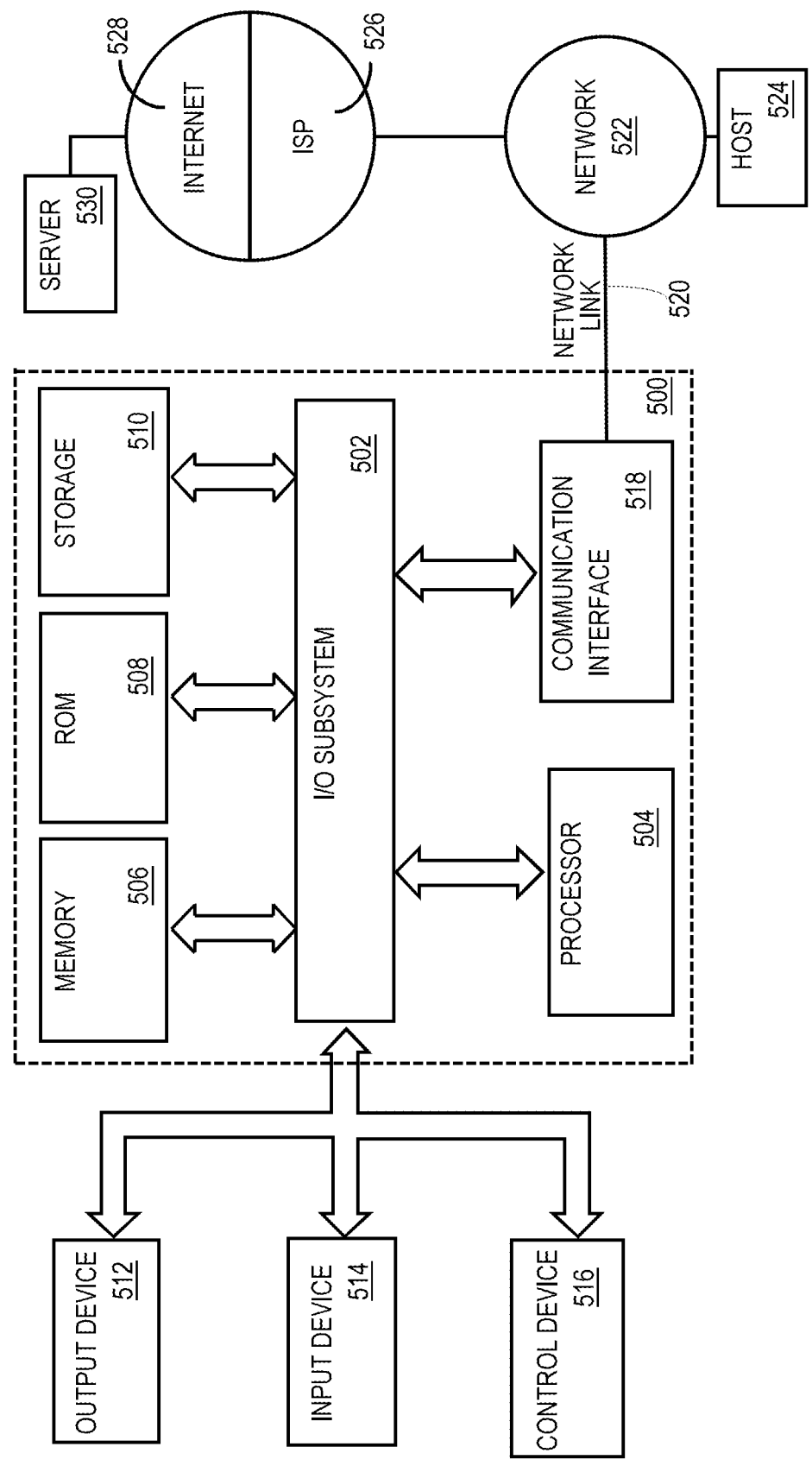
FIG. 5 illustrates a block diagram of a computing device in which the example embodiment(s) of the present invention may be embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, inter-network, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

A multi-node system comprises multiple computing nodes (each of which may also be referred to herein as a node), the nodes may being interconnected by a network. Each node in the multi-node system may be in the form of one or more computer systems. Alternatively, the nodes may be the nodes of a grid, where each node is interconnected on a rack. Each node comprises at least hardware processor connected to a main memory, or may comprise multiple hardware processors that each share access to the same main memory.

Software Overview

Figure 6:
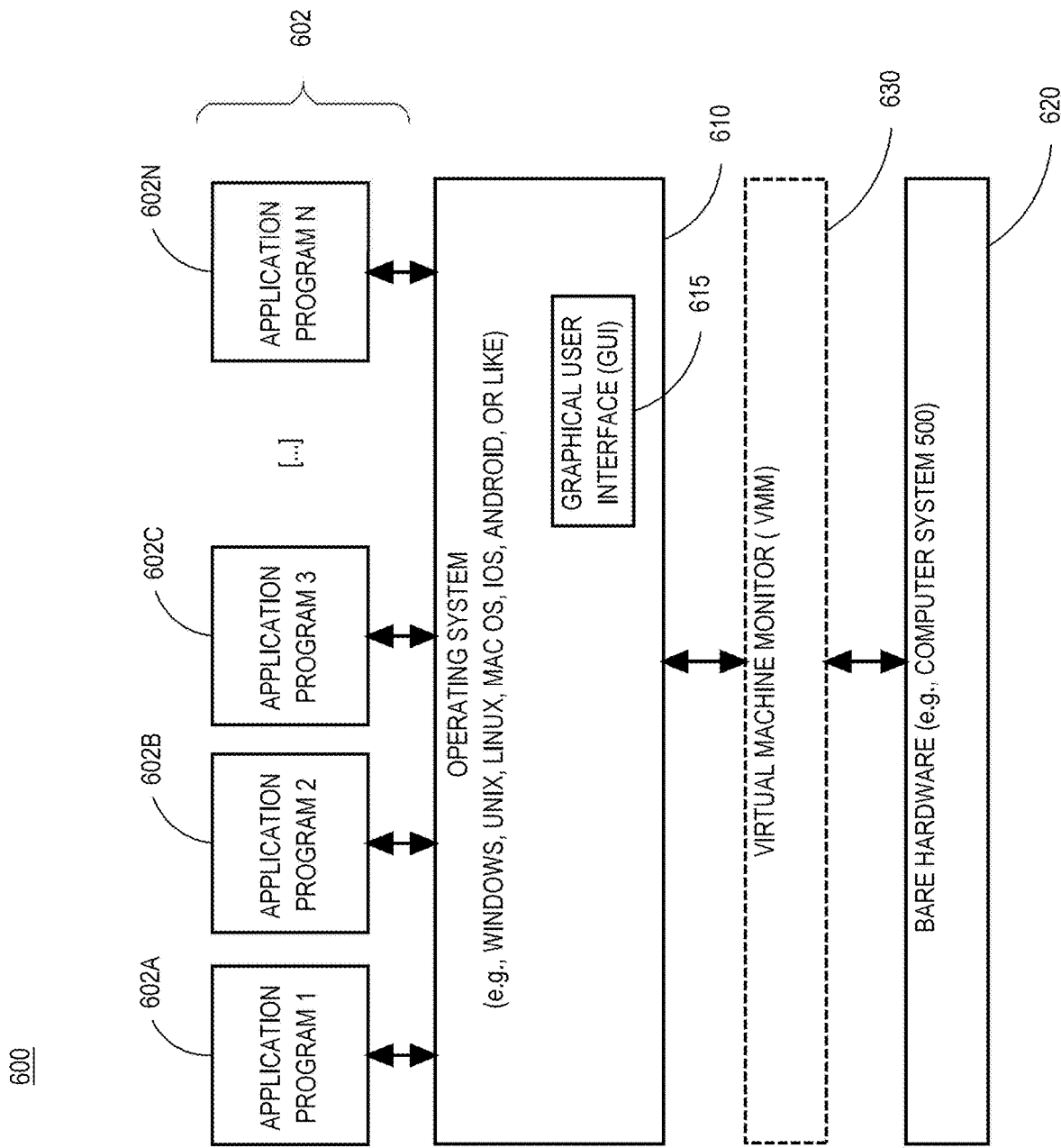
FIG. 6 illustrates a block diagram of a basic software system for controlling the operation of a computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
during a loading of a graph that is distributed in a multi-node computing system into memory, determining a plurality of available IDs, each of which is unique, for a plurality of unidentified graph components of the graph;
wherein the graph comprises a plurality of existing graph components and is distributed in the multi-node computing system, wherein each vertex in the graph is in a node in the multi-node computing system and each edge in the graph connects a source vertex with a destination vertex in the graph;
wherein each of the plurality of unidentified graph components is a vertex or an edge, in the graph, that is not associated with a unique ID;
wherein determining the plurality of available IDs for the plurality of unidentified graph components comprises:
at each node in the multi-node computing system:
generating a local data structure comprising a plurality of arrays;
wherein each of the plurality of arrays comprises K slots, K being a whole number greater than one, wherein the K slots of a respective array representing a subdomain of identifiers associated with a domain of possible identifiers;
wherein the plurality of arrays includes a root array in a root layer associated with the domain, a plurality of parent arrays, and a plurality of child arrays, wherein each child array of the plurality of arrays is linked with a slot in a respective parent array;
wherein a property of each slot in each of the plurality of arrays indicates an availability of IDs, in the subdomain represented by a respective slot; and
wherein generating the local data structure comprises, for each of the plurality of existing graph components:
inserting an ID of a respective existing graph component into a corresponding slot in the local data structure; and
deleting all sublayers of the corresponding slot responsive to determining the corresponding slot is full;
generating a merged data structure using data from the local data structure and data from local data structures associated with other nodes in the multi-node computing system; and
traversing the merged data structure to identify the plurality of available IDs based on the property of each slot in the merged data structure.

2. The method of claim 1, wherein each available ID is an integer ID, a string ID, or a composite ID.

3. The method of claim 1, wherein inserting the ID of the respective existing graph component into the corresponding slot in the local data structure comprises:
responsive to determining the corresponding slot is empty:
instantiating new sublayers until a maximum depth is reached; and
setting a count to one for all visited slots and setting the count to zero for all other slots;
responsive to determining the corresponding slot is not empty, recursively iterating the local data structure and updating the count of each visited slot.

4. The method of claim 1, wherein traversing the merged data structure comprises:
for each leaf slot in the merged data structure, starting from the left-most slot of the merged data structure to the right-most slot of the merged data structure:
iterating the merged data structure from a respective leaf slot until a visited slot is non-empty; and
identifying a subdomain of available IDs from the respective leaf slot to a slot prior to the non-empty slot.

5. The method of claim 1, wherein generating the local data structure comprises:
creating the root array, wherein the root array is associated with a plurality of allowed characters;
for each of the plurality of existing graph components, inserting an ID of a respective existing graph component, character by character of the ID, into in the local data structure, wherein inserting the ID includes creating a new array for a particular character of the ID when a specific array for the particular character does not exist.

6. The method of claim 5, wherein a depth of the local data structure is a number of characters in a prefix.

7. The method of claim 5, wherein concatenation of each character in a plurality of slots that are linked forms a prefix.

8. The method of claim 1, wherein traversing the merged data structure comprises traversing the merged data structure in a breadth-first manner and identifying a subdomain of available IDs from array indices that have null pointers or Boolean set to false.

9. The method of claim 1, further comprising generating a particular available ID from the plurality of available IDs and assigning the particular available ID to a particular graph component of the plurality of unidentified graph components.

10. The method of claim 9, wherein the particular graph component is stored on a particular node that is associated with the particular available ID.

11. One or more non-transitory storage media storing sequences of instructions which, when executed by one or more processors, cause:
during a loading of a graph that is distributed in a multi-node computing system into memory, determining a plurality of available IDs, each of which is unique, for a plurality of unidentified graph components of the graph;
wherein the graph comprises a plurality of existing graph components and is distributed in the multi-node computing system, wherein each vertex in the graph is in a node in the multi-node computing system and each edge in the graph connects a source vertex with a destination vertex in the graph;
wherein each of the plurality of unidentified graph components is a vertex or an edge, in the graph, that is not associated with a unique ID;
wherein determining the plurality of available IDs for the plurality of unidentified graph components comprises:
at each node in the multi-node computing system:
generating a local data structure comprising a plurality of arrays;
wherein each of the plurality of arrays comprises K slots, K being a whole number greater than one, wherein the K slots of a respective array representing a subdomain of identifiers associated with a domain of possible identifiers;
wherein the plurality of arrays includes a root array in a root layer associated with the domain, a plurality of parent arrays, and a plurality of child arrays, wherein each child array of the plurality of arrays is linked with a slot in a respective parent array;
wherein a property of each slot in each of the plurality of arrays indicates an availability of IDs, in the subdomain represented by a respective slot; and wherein generating the local data structure comprises, for each of the plurality of existing graph components:
  inserting an ID of a respective existing graph component into a corresponding slot in the local data structure; and
  deleting all sublayers of the corresponding slot responsive to determining the corresponding slot is full;
generating a merged data structure using data from the local data structure and data from local data structures associated with other nodes in the multi-node computing system; and
traversing the merged data structure to identify the plurality of available IDs based on the property of each slot in the merged data structure.

12. The one or more non-transitory storage media of claim 11, wherein each available ID is an integer ID, a string ID, or a composite ID.

13. The one or more non-transitory storage media of claim 11, wherein inserting the ID of the respective existing graph component into the corresponding slot in the local data structure comprises:
  responsive to determining the corresponding slot is empty:
    instantiating new sublayers until a maximum depth is reached; and
    setting a count to one for all visited slots and setting the count to zero for all other slots;
  responsive to determining the corresponding slot is not empty, recursively iterating the local data structure and updating the count of each visited slot.

14. The one or more non-transitory storage media of claim 11, wherein traversing the merged data structure comprises:
  for each leaf slot in the merged data structure, starting from the left-most slot of the merged data structure to the right-most slot of the merged data structure:
    iterating the merged data structure from a respective leaf slot until a visited slot is non-empty; and
    identifying a subdomain of available IDs from the respective leaf slot to a slot prior to the non-empty slot.

15. The one or more non-transitory storage media of claim 11, wherein generating the local data structure comprises:
  creating the root array, wherein the root array is associated with a plurality of allowed characters;
  for each of the plurality of existing graph components, inserting an ID of a respective existing graph component, character by character of the ID, into in the local data structure, wherein inserting the ID includes creating a new array for a particular character of the ID when a specific array for the particular character does not exist.

16. The one or more non-transitory storage media of claim 15, wherein a depth of the local data structure is a number of characters in a prefix.

17. The one or more non-transitory storage media of claim 15, wherein concatenation of each character in a plurality of slots that are linked forms a prefix.

18. The one or more non-transitory storage media of claim 11, wherein traversing the merged data structure comprises traversing the merged data structure in a breadth-first manner and identifying a subdomain of available IDs from array indices that have null pointers or Boolean set to false.

19. The one or more non-transitory storage media of claim 11, wherein the sequences of instructions which, when executed by the one or more processors, further cause generating a particular available ID from the plurality of available IDs and assigning the particular available ID to a particular graph component of the plurality of unidentified graph components.

20. The one or more non-transitory storage media of claim 19, wherein the particular graph component is stored on a particular node that is associated with the particular available ID.

* * * * *